Dec. 14, 1937. R. E. REASON ET AL 2,102,574
PHOTOGRAPHIC ROLL FILM CAMERA
Filed April 25, 1935   5 Sheets-Sheet 1

Inventors.
Richard Edmund Reason
and Thomas William Clifford
By Arthur S. Kent
their Attorney.

Dec. 14, 1937.   R. E. REASON ET AL   2,102,574
PHOTOGRAPHIC ROLL FILM CAMERA
Filed April 25, 1935   5 Sheets-Sheet 2

Inventors.
Richard Edmund Reason
and Thomas William Clifford
By Arthur L. Kent
their Attorney.

Dec. 14, 1937. R. E. REASON ET AL 2,102,574
PHOTOGRAPHIC ROLL FILM CAMERA
Filed April 25, 1935 5 Sheets-Sheet 3
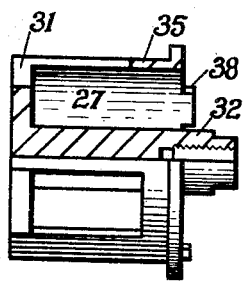
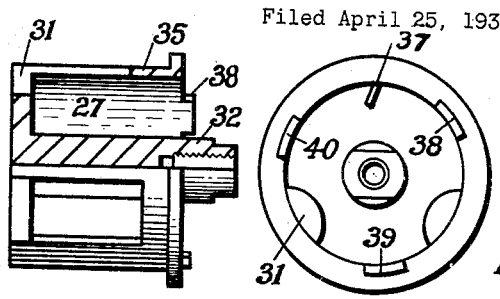
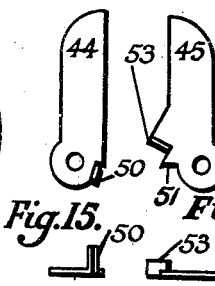
Fig. 6. Fig. 7. Fig. 15. Fig. 16. Fig. 17. Fig. 18.
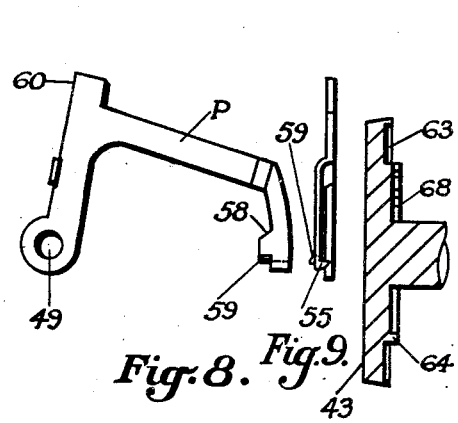
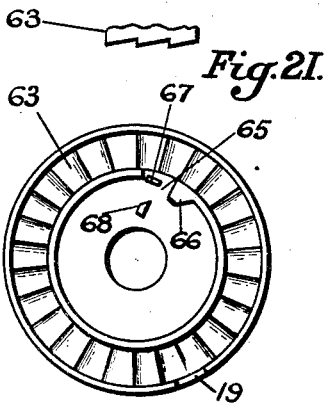
Fig. 8. Fig. 9. Fig. 20. Fig. 19.
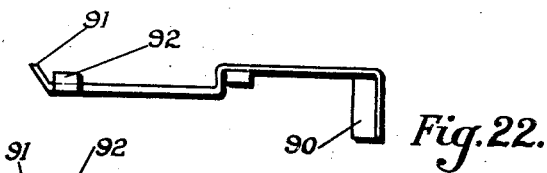
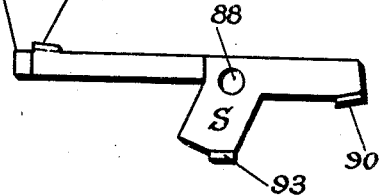
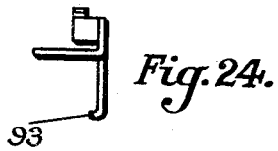
Fig. 23.
Inventors.
Richard Edmund Reason
and Thomas William Clifford
By Arthur A. Kent
their Attorney.

Dec. 14, 1937.   R. E. REASON ET AL   2,102,574
PHOTOGRAPHIC ROLL FILM CAMERA
Filed April 25, 1935   5 Sheets-Sheet 4

Inventors.
Richard Edmund Reason
and Thomas William Clifford
By Arthur L. Kent
their Attorney.

Patented Dec. 14, 1937

2,102,574

UNITED STATES PATENT OFFICE 2,102,574

PHOTOGRAPHIC ROLL-FILM CAMERA

Richard Edmund Reason and Thomas William Clifford, Leicester, England, assignors to Kapella Limited, Leicester, England, a corporation of England Application April 25, 1935, Serial No. 18,148
In Great Britain April 26, 1934

9 Claims. (Cl. 242—71)

This invention relates to photographic roll film cameras of the kind comprising an exposure chamber, a shutter, a movable counter for the exposures, means for winding the film and a movable detent adapted alternately to stop and release the film winding means for the purpose of measuring off lengths of film for successive exposures; and its principal object is to provide such a camera simplified and less liable to accidental error in its operation; and to this end to provide means whereby the winding of the film to its first exposure position is automatically prevented by the movable detent unless the counter is in its starting position, means whereby automatically the movable detent is then withheld so as to permit continuous and unobstructed winding of the film to its first exposure position, means whereby the movable detent is adapted to automatically prevent winding of the film past any exposure position until the shutter has been actuated and thereafter to automatically permit winding to the next exposure position, means whereby the movable counter is automatically advanced one step for each exposure and is adapted after the last exposure has been made to automatically cause the movable detent to be withdrawn so as to permit continuous winding of the trailer, and means whereby the detent is restored after such winding to stop the winding means, and means by which the camera lid is automatically locked when the film is in any exposure position other than the first position.

We illustrate our invention by describing, as an example, a camera constructed to take cinema film 16 millimetres wide from which, in order to obtain the largest possible picture, the customary marginal perforations are omitted. To locate the film for the first picture a suitably positioned hole or notch is provided in the film.

We shall describe such a camera with reference to the accompanying drawings, in which:

Figs. 6 and 7 show, in side and end elevation, the take-up hub and winding knob;

Figs. 8 and 9 show the shutter lever which actuates the leaves;

Figs. 15, 16, 17 and 18 show the leaves of the shutter in side and end elevation and spaced apart for clearer representation;

Figs. 19, 20 and 21 show the counter-disc;

Figs. 22, 23 and 24 show the spool lever S;

Figure 1:
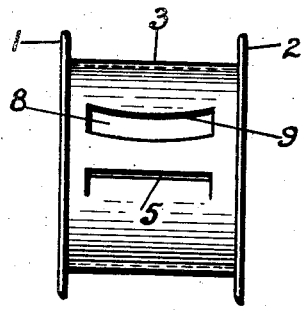
Figs. 1 and 2 show, in side and end elevation, a preferred form of spool.
Figure 2:
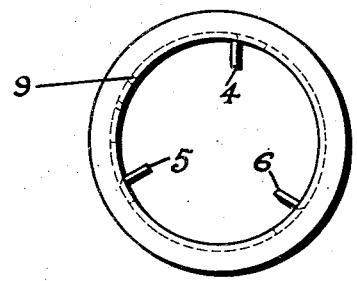

The spool shown in Figs. 1 and 2 comprises a flange 1, 2, at each end of a tubular core 3, which is adapted to slide endwise over either of two spool hubs 27, 28, in the camera.

In order to simplify the camera mechanism and the operation of moving the film between successive exposures, we make the spool cores of quite abnormal diameter in relation to the picture measurement along the film, and this enables us to move the film by successive rotational movements of the spool of constant angle not exceeding 360 degrees and preferably 120 degrees, as shown in the drawings. By this means we are able to use the 16 mm. fine-grain cinema film now available, but by omitting the usual marginal perforations we can take pictures each measuring about .56 inch by .85 inch. Sufficient sensitive film to take 24 such pictures, and having a leader and trailer, we may carry on a spool such that the diameter of the first turn of the sensitive film is .80 inch and that of the last turn is .95 inch, the film being .006 inch thick. At the same time we are able to avoid substantial waste of film between successive pictures, for it is easily shown that, with such proportions, when the spool is rotated through 120 degrees between successive pictures, the minimum clear space between them is .04 inch, and the maximum only .13 inch. When a leader and trailer are attached to the sensitive film to permit daylight loading, the outside diameter of the spool may be one inch, and, since this is also a suitable focal length for the normal objective for such a picture, such a spool can be accommodated in the case without increasing its width.

Figures 4, 5:
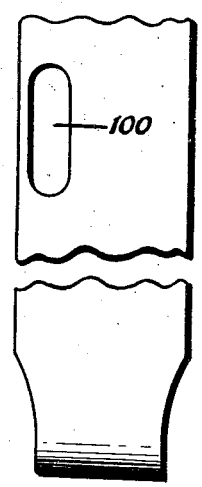
Figs. 4 and 5 show, in plan and side elevation, the corresponding film.

The supply and take-up spools are generally alike and interchangeable in the camera, but one, and preferably the take-up spool, as shown in Figs. 1 and 2, has the following essential features or is adapted to co-operate with a member having these essential features, namely:—A plurality of tongues (and preferably three, such as 4, 5, 6, projecting inwardly from the core), and one or more slots, tongues, or the like, by means of which the leading end of the film may be attached to the spool. A preferred method of attachment comprises a roll or the like 7, (Figs. 4 and 5) formed on the end of the film leader and adapted to engage with a longitudinal slot, such as 8, in the core of the spool. The slot may be curved along its length so that its trailing edge 9 is convex, and this both facilitates loading and insures that the principal tension is borne by the middle of the width of the film.

The film (Figs. 4 and 5) is provided with a leader and trailer for daylight loading. The leader and trailer may be attached to or formed integrally with the sensitive film. The film is without perforations except for one hole or notch 109, which is situated somewhat in advance of the position for the first picture, and it operates to arrest the motion of the winding mechanism when that point has been reached.

Figure 3:
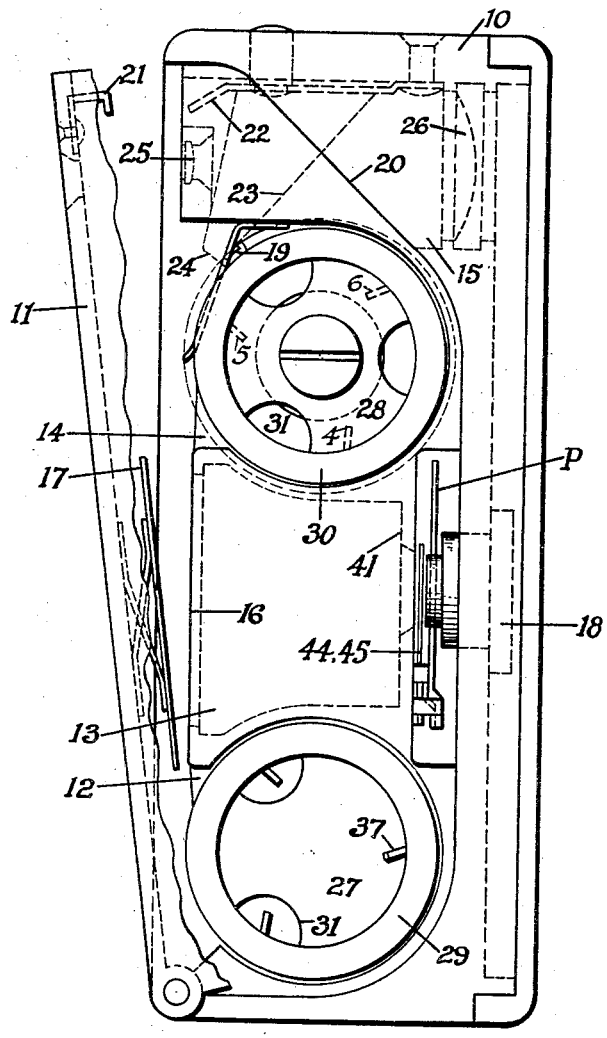
Fig. 3 represents an exterior view of the camera.
Figure 10:
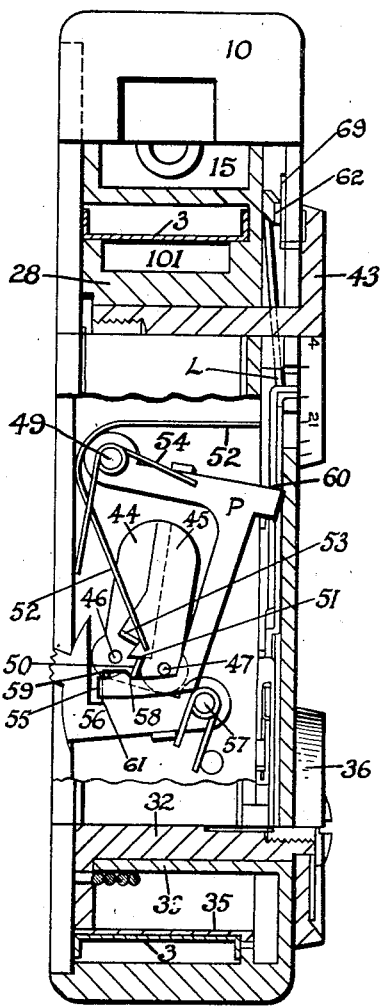
Fig. 10 is a front elevation showing, inter alia, the assembled shutter leaves and lever, the trigger, the counter, and the feed hub.
Figure 12:
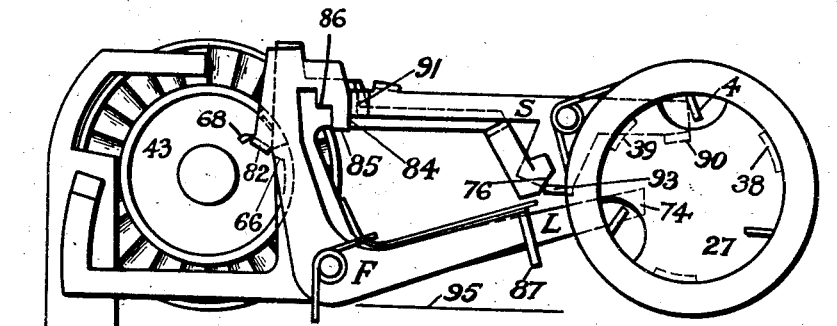
Fig. 12 shows the levers, L, F, S, and the counter, positioned ready for winding after loading the camera.

The general arrangement of the camera is shown in Figs. 3 and 10.

The casing 10 has a removable lid 11, to give access to the spools, a compartment 12, for the take-up spool, another 13, for exposing the picture, a third 14, is for the supply spool, and a fourth compartment 15, is for the finder. Guides 16 locate the film at the back of the picture compartment 13, and, in conjunction with a pressure pad 17 mounted on the lid, form the film gate. The lens 18 may be movable for focusing or may be fixed. A pair of pivoted shutter leaves 44, 45, is mounted behind the lens. The lid 11 extends down the back of the camera and over the side up to the lip 20, and is retained by the engagement of the tongue 21 with the catch 22, to which is attached a plate 23 carrying an abutment 24 adapted to engage with a notch in the counter 43 (Fig. 10) so as to prevent the lid from being opened except when the counter is in a specified position. The finder preferably comprises a collective lens 25 and a dispersive lens 26, together forming an inverted Galilean telescope.

Within the compartments 12 and 14 are mounted hubs 27, 28, adapted to carry the film spools 29, 30. The hubs may be solid cylindrical pieces but are conveniently made of sheet metal with part-cylindrical exteriors adapted to fit closely within the cores of the spools. The supply hub 28, shown in side elevation in Fig. 10, is fixed to the case, the spool rotating on it, an annulus 101 and gashes such as 31 (Fig. 3) being provided to clear the tongues 4, 5, 6, on the spool.

The take-up hub 27, shown in side elevation in Figs. 6 and 10, comprises an arbor 32, rotatable in a sleeve 33, fixed in the casing, and carrying at one end cylindrical portions 35 adapted to receive the spool, and at the other end, and outside the camera, a winding knob 36. A slot 37 is provided to engage an inward tongue 3, 4 or 5, of the spool, and gashes such as 31 are provided to clear the tongues and the roll on the end of the film. The take-up hub has three projections 38, 39, 40, adapted to engage as cams with a lever of the mechanism hereafter described.

Mounted on a panel 41 (Fig. 3) towards the front of the camera are the shutter leaves 44, 45, and the shutter lever P, shown in greater detail in Figs. 15, 16, 17, 18 and 10. Mounted towards the lower side of the camera are the counter lever (Figs. 25 and 26), film lever (Figs. 27, 28 and 29) and spool lever (Figs. 22, 23 and 24), hereafter to be described more particularly. Mounted on an arbor extending through the supply hub 28 is a counter disc 43 (Fig. 10).

The two leaves of the shutter, 44, 45 (Figs. 15, 16, 17 and 18) are pivoted to the case at 46, 47, (Fig. 10) and adapted to overlap one another when the shutter is closed. The leaves are adapted to be moved round their pivots so as to open the shutter by means of the shutter lever P (Figs. 8 and 9) hereafter described, which thrusts an upturned lug 50, integral with the leaf 44 and adapted to abut against the edge 51 of the leaf 45, the leaf 45 being urged against the lug 50 by means of the spring 52 engaging an upturned lug 53 on the leaf 45.

The shutter lever P, shown more particularly in Figs. 8 and 9, is set in a plane substantially parallel to the front of the camera and is pivoted, as shown in Fig. 10, to the case 10 at 49 and is urged by a spring 54 in anti-clockwise direction.

This lever has a downwardly-turned lug 55 adapted to be held by the end 61 of a spring-urged detent or trigger 56 (pivoted to the case 10 at 57) after being moved into this position by the winding of the film after each exposure. The lever also has a cam face 58 which lies approximately at 45 degrees to a line radial to the pivot 49 and is adapted to engage the lug 50 of the shutter leaf 44 so as to open the shutter when the lever is released by the trigger, after which movement the lever, continuing in anti-clockwise direction, permits the lug 50 to escape under the upturned trailing edge 59 of the cam, and the shutter is then closed by its spring 52. The lever has also an abutment 60 approximately radial to the pivot centre 49 and adapted to engage abutments on the counter and film levers to be described. On the return of the lever its edge 59 climbs over the abutment 50.

Mounted on the outside of the case 10 is a counter-disc 43, shown more particularly in Figs. 19 and 20, adapted for rotation on the axis of the hub 28. The disc is marked outside with a series of consecutive numbers to indicate successive pictures, and these read against an index mark on the case. Inside the disc is formed as a ratchet wheel with teeth 63 (Figs. 19 and 20) adapted to be operated by means of the counter-lever so as to turn the counter-disc intermittently when the film is advanced after each exposure.

Attached to the inner side of the counter-disc is a cam 64 having a segment 65 removed, a hump or projection 66 at the leading edge of the opening, and a spring-urged latch 67 on the trailing edge. A stop pin 68 projects from the inside of the counter-disc in the plane of the cam as hereafter described. The interior edge of the cam, the segmental notch 65, the hump 66, and the latch 67 and the pin 68, co-operate with an abutment on one end of a spring-urged film detent lever F, as hereafter described. Preferably, as will be explained, the number of ratchet teeth exceeds by two the number of pictures to be exposed on one length of film. A spring pawl 69 (Fig. 11) of sheet metal fixed to the case has a free end 70 which operates to prevent backward turning of the counter.

Figures 25, 26:
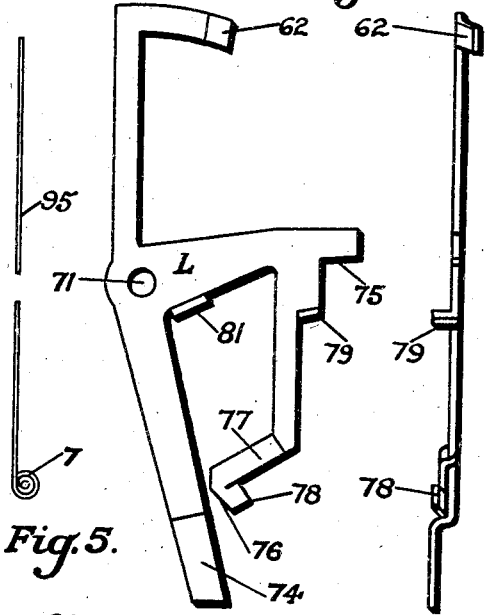
Figs. 25 and 26 show the counter lever L.

The counter lever L, shown particularly in Figs. 25 and 26 is pivoted at 71 on the case, is urged anti-clockwise by the spring 72, and rests normally against the abutment 73 on the case. The end 74 of the lever is engaged and passed, in succession as the winding knob 36 is turned, by the plurality of projections 38, 39, 40, on the hub 27, so that the lever L is moved in a clockwise direction from the abutment 73, and is then permitted to return. During each such complete movement the lever performs the following functions, viz, on the forward movement:—

(1) The end 62 (which operates as a spring-pawl) advances the counter one division, together with the cam;

(2) The radial edge 75 pushes abutment 60 of the spring-urged shutter lever P into the position in which that lever is held by the trigger 56 ready to operate the shutter;

(3) The cam-shaped abutment 76 on the arm 77, which is elastic and free to move up and down, engages an abutment 93 on a spool lever hereafter described;

(4) On the return movement of the lever L, during loading or removing film, a sloping latch 78 enables the elastic arm 77 to ride over the aforesaid abutment 93 on the spool lever S.

An upturned lug 79 on the lever L is adapted to engage a down-turned lug 92 on the spool lever S so that the lever is held against motion during loading and unloading of the film.

Figure 27:
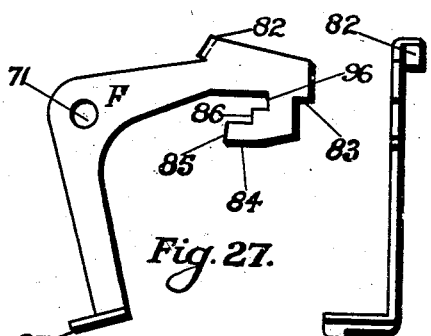
Figs. 27, 28 and 29 show the film lever F.
Figures 28, 29:
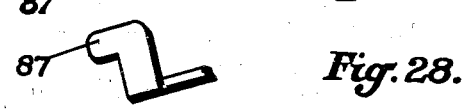
Figure 11:
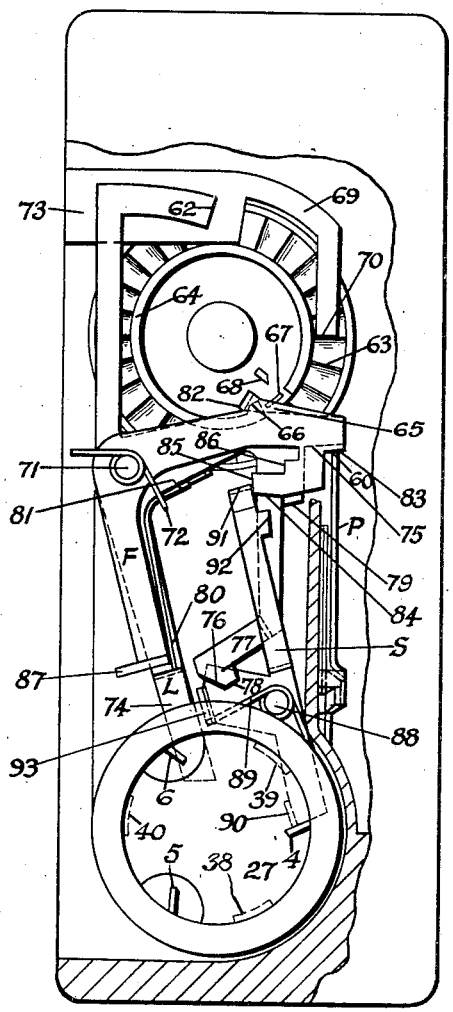
Fig. 11 is a side elevation of Fig. 10, showing the mechanism set for exposure.

The film lever F shown in Figs. 27, 28 and 29 is pivoted to the case 10 at 71, coaxially with the counter lever L and is spring-urged in clockwise direction as shown in Fig. 11 by the free end of a spring 80 whose other end is fixed preferably to the lug 81 on the counter lever. When so urged, the lever F is normally arrested by the edge 82 of a lug down-turned from the lever and bearing against the inside of the counter cam 64 as shown in Fig. 11. This lug also co-operates with the segmental notch 65, the hump 66, the latch 67, and the stop 68, of the cam 64, as will be hereafter described. The radial abutment 83 of the lever F is adapted to be moved against the action of the spring 80 by means of the abutment 60 on the shutter lever P. The approximately radial abutment 84 is adapted to be engaged by the spool lever S so as to arrest the motion of the film lever F under the action of its spring during loading and unloading of the film. The approximately tangential abutments 85, 86, are adapted respectively to position the spool lever S at different periods of its operation. The upturned and cranked finger 87 is adapted to enter the perforation 100 in the film to position the film for the first exposure, and thereby co-ordinates the operation of the spool detent lever S and the counter lever L, and determines the proper positions on the film of all subsequent exposures.

The spool lever S, shown more particularly in Figs. 22, 23 and 24, is pivoted at 88 to the case 10 and urged by the spring 89 in clockwise direction. It has an upwardly-turned lug 90 forming an abutment adapted to engage successively the projections 4, 5, 6, of the spool and thereby locate it and the film in successive positions proper for exposure, and while doing so this lever is held in position by its abutment 91 which is formed to engage the aforesaid abutments 85, 86, of the film lever F. The end 91 is bent downward at such an angle that the said abutments 85, 86, may return underneath the end 91.

A lug 92 is turned downward to form an abutment adapted to engage the corresponding abutment 79 of the counter lever L, whereby the two levers hold each other in their inoperative positions while the leader and trailer of the film are being wound.

An upwardly-turned lug 93 forms an abutment which is engaged by the cam-shaped end 76 of the counter lever L, whereby the spool lever S is periodically restored to its normal position.

The operation of the camera and of its mechanism will be described with reference to Figs. 3, 12, 13, 14 and 11.

To load the camera the catch 22 is depressed and the lid opened, but this can only be accomplished when the counter is in the position in which the safety catch 24 engages the slot 19 in the counter, permitting motion of 22. In this position the counter reads "1". Having opened the lid, a full spool of film is placed on the hub 28, an empty spool on 27, the film threaded, and the lid closed. The counter disc 43 is now turned to the position shown in Fig. 12, that is, until its motion is arrested by its pin 68 striking the abutment 82 of the film lever F. During this motion the following movements occur:—

(1) The hump 66 engages the abutment 82 of the lever F and moves the lever so that its abutment 85 passes clear of the abutment 91 on the spool lever S;

(2) The spool lever moves under the action of its spring until its abutment 93 encounters the cam 76 of the counter lever L;

(3) In this position the lug 90 of the spool lever S passes clear of the projection 3 (for example) of the spool, which is thereby set free for winding.

Figure 13:
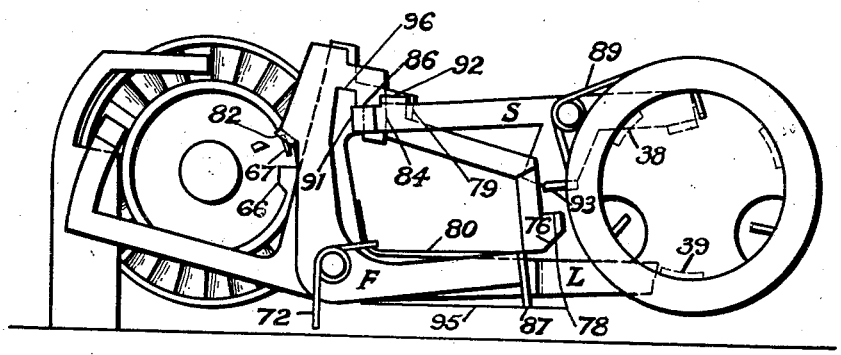
Fig. 13 shows the levers L, F, S, after 120 degrees rotation of the winding knob.

The film is now wound by turning the knob 36, and during the first 120 degrees rotation, which brings the mechanism to the position shown in Fig. 13, the following movements occur:—

(1) The projection 39 of the hub 27 (Fig. 12) encounters the arm 74 of the counter lever L, and moves said lever so that its cam 76 pushes the abutment 93 of the spool lever;

(2) The spool lever S is turned by this means until its abutment 91 passes clear of the abutment 84 of the film lever beyond the abutment 85;

(3) The counter is advanced one division;

(4) The film lever, now freed, moves clockwise under the action of its spring until the end 87 rests against the surface of the film leader 95;

(5) During this action the abutment 85 of the film lever F passes the abutment 91 of the spool lever S and permits the spool lever to turn clockwise until its abutment 91 rests against 86 on the film lever.

The positions in Fig. 13 have now been reached, and the abutment 79 on the counter lever L has fallen behind the abutment 92 on the spool lever S. The levers interlock and hold each other in their inoperative positions and the hub and spool may be rotated continuously. Presently the hole 100 through the film reaches the finger 87 which, urged by the spring 80, then falls into the hole, and the following movements occur:—

(1) The ensuing clockwise rotation of the film lever F moves the abutment 86 so that it no longer engages the detent 91 on the spool lever S;

(2) The spool lever, thus released, and urged by its spring 89, rotates clockwise, the abutment 91 falling into the notch 96 and the detent 92 passing out of engagement with the abutment 79 on the counter lever L;

(3) The counter lever, thus released, and urged by its spring 72, therefore rotates anti-clockwise, its abutment 79 engaging the abutment 84 on the film lever F which is thereby carried with it;

(4) The abutment 82 of the film lever F then depresses and passes the latch 67 of the counter cam, and the portion of the lever between the gap 96 and the edge 84 lifts, and passes under, and stays under, the abutment 91 on the spool lever S. Simultaneously the upwardly-raised trailing edge 78 of the cam 76 on the counter lever L climbs over the abutment 93 on the spool lever.

Figure 14:
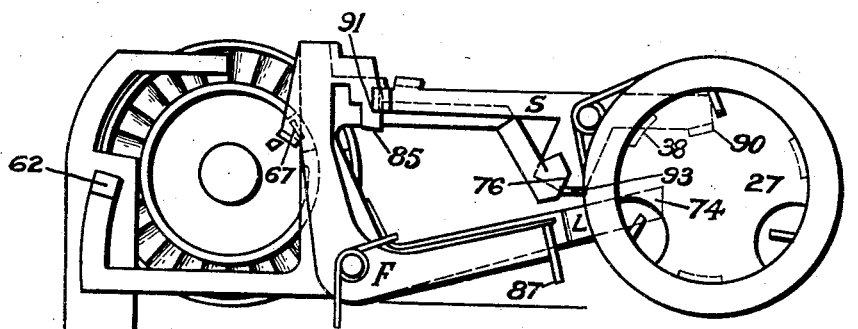
Fig. 14 shows the levers L, F, S, after engagement of the film lever with the aforesaid hole in the film.

The position in Fig. 14 has now been reached. The spool detent 99 is still disengaged from the spool, the end 87 of the film lever is held out of engagement of the film by the latch 67 of the counter, and the cam 76 on the counter lever L is in position to operate the spool lever S. The hub 27, therefore, is free to wind, whereupon the following operations occur:—

(1) The hub abutment 38 engages the arm 74 of the counter lever L, which is thereby moved clockwise;

(2) As the lever moves, its cam 76 drives the spool lever S anti-clockwise through the abutment 93, and its abutment 62 advances the counter;

(3) The detent 91 slips over the end 85 of the film lever F;

(4) The spool lever S is constrained by the engagement of abutments 85 and 91 in such position that the abutment 90 engages the next arriving tongue 5 on the spool, whose motion is thereby presently arrested;

(5) Before the motion ceases the hub abutment 38 passes the end of the counter lever L, which then returns under the action of its spring to the starting position shown in Fig. 14.

The various levers have now all reached the position for the first exposure shown in Fig. 11, in which the spool lever S is arresting the motion of the spool hub 27, and the counter lever L is in its normal position. Film for the first picture is in the gate, and the shutter lever has been set, while the counter lever turned, by engagement of the abutment 75 on the counter lever with the abutment 69 on the shutter lever P.

Normally the shutter is set automatically after the last picture is taken, and remains set during the operation of reloading; but if for any reason it has been in the meantime released, it will be reset during the movements of the counter lever just described, and be ready for the first exposure.

To release the shutter and effect an exposure the trigger 56 is depressed, and thereafter these operations occur:—

(1) The trigger abutment 61 disengages the detent 55 on the end of the shutter lever P;

(2) The shutter lever then rotates under the action of its spring and first opens the shutter and then permits it to close, and then continues its motion until its abutment 60 engages the abutment 83 on the film lever F;

(3) The film lever is thereby rotated anticlockwise until its abutment 85 slides past the detent 91 on the spool lever S;

(4) The spool lever, thus released, rotates clockwise, under the action of its spring, to an inoperative position in which its detent 91 is alongside the abutment 84 on the film lever, and its abutment 90 has released the spool tongue with which it previously engaged, so permitting renewed rotation of the spool.

As the winding knob is rotated for the next picture, the following operations occur:—

(1) The hub abutment next arriving engages the end 74 of the counter lever which is thereby rotated and which, in rotating, resets the spool lever by the engagement of 76 and 93 as already described, advances the counter, and resets the shutter lever by the engagement of the abutments 75 and 60;

(2) The shutter lever having been reset, and thereby disengaged from the film lever, with which it contacted at 83, the film lever, urged by its spring, returns to its normal position in which the abutment 82 rests against the rim of the counter cam, and the abutment 85 is in position to engage and retain 91;

(3) The detent 91 engages 85 and is thus retained in position for the abutment 90 to engage the next arriving spool tongue;

(4) The counter lever is finally released by the hub abutment and returns to its starting position, and the motion of the hub is thereafter arrested.

The camera is now ready for a further exposure, and the immediately foregoing sequence is therefore repeated until the last picture has been exposed.

Fig. 11 shows the counter and mechanism ready for the last exposure. After exposure the winding knob has been freed for rotation, and when advanced actuates the counter lever as already described whereby the shutter and spool levers are reset. The film lever, however, is moved anti-clockwise by the hump on the cam 64 so that the abutment 85 is held out of engagement with the detent 91; the spool lever, urged by its spring, therefore rotates to its inoperative position, permitting yet further rotation of the hub. As the hub continues to rotate the counter lever again repeats its cycle of operations, resetting the spool lever and advancing the counter, which reaches the position in which the notch 65 in the cam permits the detent 82 to pass through it, thereby permitting the film lever to move until its finger 87 reaches the film, in which position the detent 91 on the spool lever rests on the abutment 86 of the film lever. The mechanism of the camera is thus in the position described with regard to Fig. 13, and continuous rotation of the hub 27 is therefore possible. When the trailer has been wound off, the film lever falls as though through the hole and the hub 27 thereafter comes to a stop as described with regard to Fig. 14. At this point the lid may be opened for reloading. Alternatively, if it is desired to use a form of attachment of the trailer to the spool which does not permit withdrawal through the gate, a second hole such as 100 may be provided towards the end of the trailer to permit the necessary terminating operation of the finger just described.

What is claimed is:

1. In a film camera having a spool for the film, a stop or stops connected with the spool at equal angular distances, a winder for the spool, a movable detent co-operating with the stop or stops so as to permit and determine successive constant angular movements of the spool, a film finger adapted to engage a hole in the film and thereby cause the movable detent to engage said stop or one of said stops to position the film for the first exposure, and a controlling cam movable intermittently by the winder and adapted to position the film finger alternatively in or out of engagement with the film.

2. In a film camera having a spool for the film, winding means for the spool, a stop or stops connected with the spool and a detent co-operating therewith to determine the positions of the sensitive film for successive exposures, a controlling cam actuated intermittently by the winding means and adapted to restrain the detent from stopping the motion of the spool during the winding of the leading or trailing ends of the film.

3. A camera comprising a supply spool, a take-up spool, a counter disc, a movable detent adapted in one position to prevent rotation of the take-up spool, and means associated with the counter disc for moving said detent out of said position when the counter disc is moved into its starting position to enable the take-up spool to be rotated to bring the film into position for the initial exposure.

4. A camera as in claim 3, in which said means comprise a cam movable with the counter disc and a movable abutment adapted normally to be held by the cam so as to hold the movable detent in operation to prevent winding, the cam being adapted in the starting position of the counter to release the abutment and the detent, and thereby release the take-up spool.

5. A camera as in claim 3, which also comprises means for moving said detent into position to prevent rotation of the take-up spool as soon as the film reaches its first exposure position.

6. A camera as in claim 3, which also comprises a spring-urged finger adapted to pass through an aperture in the film leader when, by winding the film to its first exposure position, said aperture comes under said finger, and a connection between said finger and said detent whereby when the finger passes through said aperture said detent moves into position to prevent rotation of the take-up spool.

7. A camera as in claim 3 which also comprises a shutter, means for actuating the shutter and simultaneously causing said detent to move out of its rotation-prevention position to permit the take-up spool to be turned to bring a further section of film into position for exposure.

8. A camera comprising a supply spool, a take-up spool, a counter disc, a movable detent adapted in one position to prevent rotation of the take-up spool, and means associated with the counter disc for moving said detent out of said position when the counter disc is moved into its final position to enable the take-up spool to be rotated to wind the trailer of the film thereon.

9. A camera comprising a supply spool, a take-up spool, a counter disc, a movable detent adapted in one position to prevent rotation of the take-up spool and a cam movable with the counter disc for moving said detent out of said position when the counter disc is moved into its starting position to enable the take-up spool to be rotated to bring the film into position for the initial exposure, a spring-urged finger adapted to pass through an aperture in the film leader when by winding the film to its first exposure position said aperture comes under said finger, and a connection between said finger and said detent whereby when the finger passes through said aperture said detent moves into position to prevent rotation of the take-up spool, said cam being adapted to hold the finger out of contact with such part or parts of the film as receive the exposures.

RICHARD EDMUND REASON.
THOMAS WILLIAM CLIFFORD.